United States Patent Office 2,881,225
Patented Apr. 7, 1959

2,881,225

PREPARATION OF GRIGNARD REAGENTS

Emil Kaiser, Chicago, and Lorraine Sporar, Joliet, Ill., assignors to Armour and Company, Chicago, Ill., a corporation of Illinois No Drawing. Application November 22, 1954
Serial No. 470,520

3 Claims. (Cl. 260—665)

This invention relates to the preparation of Grignard reagents, and more particularly to the preparation of aryl magnesium chlorides.

The Grignard reagents are organic magnesium halide compounds which are useful in organic synthesis. In the Grignard reaction, carbon atoms are synthetically introduced into an organic material. Generally, the organic radical of the Grignard reagent is introduced into the hydrocarbon radical of a compound through a condensation reaction.

In certain instances, it may be desirable to introduce, into an organic compound, an aryl radical, possibly to prepare an addition compound or to provide an intermediate purification product. For example, in the preparation of sex hormones from bile acids, it is desirable to degrade the side chain at the 17 carbon in cholic acids. This degradation procedure may involve the production of a diphenyl derivative of such side chain. It is possible to prepare this phenyl substituent by reaction of the cholic acid material with an appropriate Grignard reagent.

The reagent usually employed for this purpose is phenyl magnesium bromide. This compound is prepared by reacting bromobenzene with magnesium or an alloy thereof. However, bromobenzene is relatively expensive and its cost contributes measurably to that of the finished product. The use of a comparatively inexpensive phenyl halide could measurably alleviate this undesirable situation. However, chlorobenzene, which is easily prepared at a reasonable cost, reacts with magnesium in a rather sluggish manner. In practice, any reaction between these two substances occurs only under extraordinary conditions. For example, this reagent has been prepared by reacting chlorobenzene with magnesium over a period of 3 to 3.5 hours, at a temperature in excess of 160° C. and at a pressure of about 2.5 atmosphere. Even under these conditions the yield of reaction product is relatively low. Thus, the cost of preparation of the Grignard reagent overcomes the ready availability of the starting material. The aryl magnesium chlorides have heretofore not been prepared in high yield in a simple, inexpensive operation.

We have discovered a method of reacting a magnesium material and an aryl chloride, whereby the Grignard reagent product is obtained in high yield under simple operating conditions.

In this reaction the magnesium material is reacted with an aryl chloride in the presence of tetrahydrofuran. The mechanics of this reaction are not completely known, and the result is somewhat startling. It has been reported that magnesium reacts with the hydrofurans very poorly, resulting in a structurally modified hydrofuran product.

However, in our invention the preparation of the Grignard reagent proceeds smoothly and rapidly with the reaction product recovered in high yield.

In the preferred practice of our invention, the magnesium material is combined with tetrahydrofuran to form a suspension. This suspension is then mixed with an aryl chloride, whereby the chloride reacts with the magnesium to provide the aryl magnesium chloride.

The concentration of reactants and reagents employed in practicing our invention may be varied widely. However, it is desirable to provide an excess of the aryl halide in the initial stages of the reaction so that there will be afforded a greater reaction surface to the magnesium material.

In the practice of our invention any aryl halide material may be employed. Suitably, any aryl chloride may be utilized, and especially desirable results are obtained when chlorobenzene is used.

The magnesium material in the reaction mixture may be any magnesium useful in Grignard reagents. For example, metallic magnesium, alloys of magnesium, or salts of magnesium may be employed.

The conditions for the reaction may be varied widely without measurably affecting the rate or completeness of reaction.

If desired, the reaction can be triggered, i.e. the reaction between magnesium and the aryl chloride may be initiated, by the introduction of a small amount of an aryl bromide into the reaction mixture. Further, if the reaction ceases or slows down, it may be accelerated by the addition of an aryl bromide.

Iodine does not serve to trigger our reaction as it does various others in the preparation of Grignard reagents. However, if desired, a small amount of iodine may be introduced into the reaction mixture as an aid in maintaining the speed of reaction between magnesium and the aryl bromide.

The aryl magnesium chlorides may be substituted for aryl magnesium bromines in any of the widely practiced uses of that compound.

The following specific examples will serve to further illustrate the preferred embodiments of our invention.

*Example I*

25 grams of magnesium and a few crystals of iodine were introduced into a flask equipped with a condenser.

To the material in the flask were added 6 ml. of bromobenzene and 12 ml. of tetrahydrofuran. These reagents were added slowly using a drop funnel. The mixture was stirred slowly until the reaction started.

To the flask was added, dropwise, a solution containing 108 ml. of chlorobenzene and 218 ml. of tetrahydrofuran. The addition time was 35 minutes. The reaction mixture was refluxed two hours.

The phenyl magnesium chloride had been formed smoothly and completely.

*Example II*

A manufacturing scale batch of the special Grignard reagent was prepared by the following method. Magnesium, in the amount of 72.5 pounds, was combined with 5.33 gallons of tetrahydrofuran in a glass-lined tank, and the mixture was heated to a temperature of 50° C. Thereafter, the starter solution consisting of 2.4 gallons of bromobenzene in 5.5 gallons of tetrahydrofuran was added slowly to the mixture in the glass-lined tank, while such mixture was maintained under constant agitation.

A solution containing 44 gallons of monochlorobenzene and 86 gallons of tetrahydrofuran was added to the mixture in the reaction vessel over a period of 90 minutes, while such mixture was maintained under constant agitation. This reaction mixture was refluxed for a period of two hours, and the reaction proceeded smoothly and rapidly.

The yield of Grignard reagent produced was 100% as calculated from the quantity of magnesium introduced into the reaction.

While in the foregoing specification the novel reaction mixture and method of this invention have been described in considerable detail by reference to specific embodiments thereof, it will be apparent to those skilled in the art that the invention is susceptible to other embodiments and that many of the details set forth can be varied widely without departing from the basic concepts of the invention.

We claim:

1. In a method of preparing an aryl magnesium chloride, the steps of mixing metallic magnesium and a minor portion of an aryl bromide in tetrahydrofuran thus providing a suspension thereof and combining said suspension comprising metallic magnesium, aryl bromide and tetrahydrofuran with a major portion of an aryl chloride, whereby the aryl bromide initiates the reaction of said metallic magnesium and said aryl chloride.

2. The method of claim 1 in which said aryl bromide is bromobenzene.

3. The method of claim 1 in which said aryl chloride is chlorobenzene.

References Cited in the file of this patent

UNITED STATES PATENTS 2,552,676   Hill _____ May 15, 1951

OTHER REFERENCES

Fieser et al.: "Organic Chemistry," 2nd ed., 1950 (D. C. Heath and Co., Boston. Page 135 relied upon).

"Grignard Reactions of Nonmetallic Substances," by Kharasch et al., page 24 (1954), Prentice Hall Inc.